United States Patent
Gutmann

(10) Patent No.: US 10,303,178 B1
(45) Date of Patent: May 28, 2019

(54) COLLISION MITIGATION STATIC OCCUPANCY GRID

(71) Applicant: Waymo LLC, Mountain View, CA (US)

(72) Inventor: Jens-Steffen Ralf Gutmann, Cupertino, CA (US)

(73) Assignee: Waymo LLC, Mountain View, CA (US)

( * ) Notice: Subject to any disclaimer, the term of this patent is extended or adjusted under 35 U.S.C. 154(b) by 0 days.

(21) Appl. No.: 15/842,983

(22) Filed: Dec. 15, 2017

(51) Int. Cl.
*G05D 1/02* (2006.01)
*B60W 50/14* (2012.01)
*B60W 30/09* (2012.01)

(52) U.S. Cl.
CPC ........... *G05D 1/0223* (2013.01); *B60W 30/09* (2013.01); *B60W 50/14* (2013.01); *G05D 1/0214* (2013.01); *B60W 2550/10* (2013.01)

(58) Field of Classification Search
CPC ...... G05D 1/0223; G05D 1/0214; G05D 1/02; B60W 50/14; B60W 30/09; B60W 2550/10
USPC .......................................................... 701/23
See application file for complete search history.

(56) References Cited

U.S. PATENT DOCUMENTS

| | | | |
|---|---|---|---|
| 8,126,642 B2 * | 2/2012 | Trepagnier | G01S 17/023 701/423 |
| 8,260,539 B2 | 9/2012 | Zeng | |
| 9,335,766 B1 | 5/2016 | Silver et al. | |
| 9,738,278 B2 * | 8/2017 | Hasberg | G06K 9/00805 |
| 2011/0054783 A1 * | 3/2011 | Kishikawa | G01C 21/3632 701/533 |
| 2015/0210311 A1 * | 7/2015 | Maurer | B60W 30/09 701/41 |
| 2015/0336502 A1 * | 11/2015 | Hillis | B60Q 1/26 701/23 |
| 2017/0083021 A1 | 3/2017 | Balaghiasefi et al. | |

OTHER PUBLICATIONS

Vu et al., Object Perception for Intelligent Vehicle Applications: a multi-sensor fusion approach, Intelligent Vehicles Symposium, 2014 IEEE, Jun. 2014, Dearborn, MI, U.S., pp. 100-106.

* cited by examiner

*Primary Examiner* — Tan Q Nguyen
(74) *Attorney, Agent, or Firm* — Botos Churchill IP Law

(57) ABSTRACT

A system and method for avoiding or mitigating collisions by an autonomous vehicle is provided. Raw sensor data for the vehicle's environment is received, such as through a perception system of the vehicle. A trajectory is also received, the trajectory having a width corresponding to a distance that is at least as wide as the vehicle. The trajectory and raw sensor data are projected onto a grid, such as a static occupancy grid, having a plurality of cells. It is determined whether any cell that overlaps with the trajectory includes the raw sensor data. It is further determined, based on the raw sensor data, whether an obstacle is present along the trajectory. When no obstacles are determined to be present along the trajectory, the trajectory may be verified. However, where obstacles are determined to be present, the vehicle may take an action to avoid collision.

21 Claims, 12 Drawing Sheets

US 10,303,178 B1

COLLISION MITIGATION STATIC OCCUPANCY GRID

BACKGROUND

Autonomous vehicles, such as vehicles that do not require a human driver, can be used to aid in the transport of passengers or items from one location to another. Such vehicles may operate in a fully autonomous mode where passengers may provide some initial input, such as a pickup or destination location, and the vehicle maneuvers itself to that location.

In order to determine how to maneuver a driverless vehicle through an environment, the vehicle may generate a trajectory showing its proposed movement. It is critical, however, to ensure that the vehicle will not collide with another object as it is maneuvered through the environment.

BRIEF SUMMARY

One aspect of the disclosure provides a method of verifying a trajectory of a vehicle through a driving environment. The method includes receiving, from a perception system of the vehicle, raw sensor data for the vehicle's environment, receiving the trajectory, and projecting the trajectory and the raw sensor data onto a grid having a plurality of cells. The method further includes determining whether any cell including the raw sensor data overlaps with the trajectory, determining, based on the raw sensor data within cells that overlap with the trajectory, whether an obstacle is present along the trajectory, and when no obstacles are determined to be present along the trajectory, verifying the trajectory. In some cases, the trajectory is computed using processed sensor data received from a perception system of the vehicle. Determining whether an obstacle is present along the trajectory may include determining, for each given cell that overlaps with the trajectory, whether the given cell includes a threshold number of data points of the raw sensor data. The grid may be updated periodically or continuously. As the vehicle moves a distance, new cells may be added to the grid, the new cells being initialized with an unknown occupancy. A count for each cell is increased for each sensor data point that indicates an object above the ground, and the count is decreased for each sensor data point that refers to the ground. When the trajectory is verified, the vehicle is maneuvered along the trajectory. When the trajectory is not verified, however, the vehicle may take a responsive action, such as generating an alert of slowing movement of the vehicle to avoid collision.

Another aspect of the disclosure provides collision mitigation system for a vehicle. The system includes a memory and one or more processors in communication with the memory. The one or more processors are configured to receive, from a perception system of the vehicle, raw sensor data for an environment of the vehicle, receive a trajectory, the trajectory having a width corresponding to a distance that is at least as wide as the vehicle, project the trajectory onto a grid having a plurality of cells, project the raw sensor data onto the grid, determine whether any cell including the raw sensor data overlaps with the trajectory, determine, based on the raw sensor data within cells that overlap with the trajectory, whether an obstacle is present along the trajectory, and when no obstacles are determined to be present along the trajectory, verify the trajectory.

Yet another aspect of the disclosure provides an autonomous vehicle, including an acceleration system, a steering system, a braking system, a perception system, and a control system in communication with the acceleration system, the braking system, and the perception system. The control system includes one or more processors configured to receive, from the perception system of the vehicle, raw sensor data for an environment of the vehicle, receive a trajectory, the trajectory having a width corresponding to a distance that is at least as wide as the vehicle, project the trajectory onto a grid having a plurality of cells, project the raw sensor data onto the grid, determine whether any cell including the raw sensor data overlaps with the trajectory, determine, based on the raw sensor data within cells that overlap with the trajectory, whether an obstacle is present along the trajectory, and when no obstacles are determined to be present along the trajectory, verify the trajectory. The control system causes the acceleration system and the steering system to maneuver the vehicle along the trajectory when the trajectory is verified, and wherein the control system causes the braking system to slow movement of the vehicle to avoid a collision when the trajectory is not verified.

DETAILED DESCRIPTION

Overview

Figure 1:
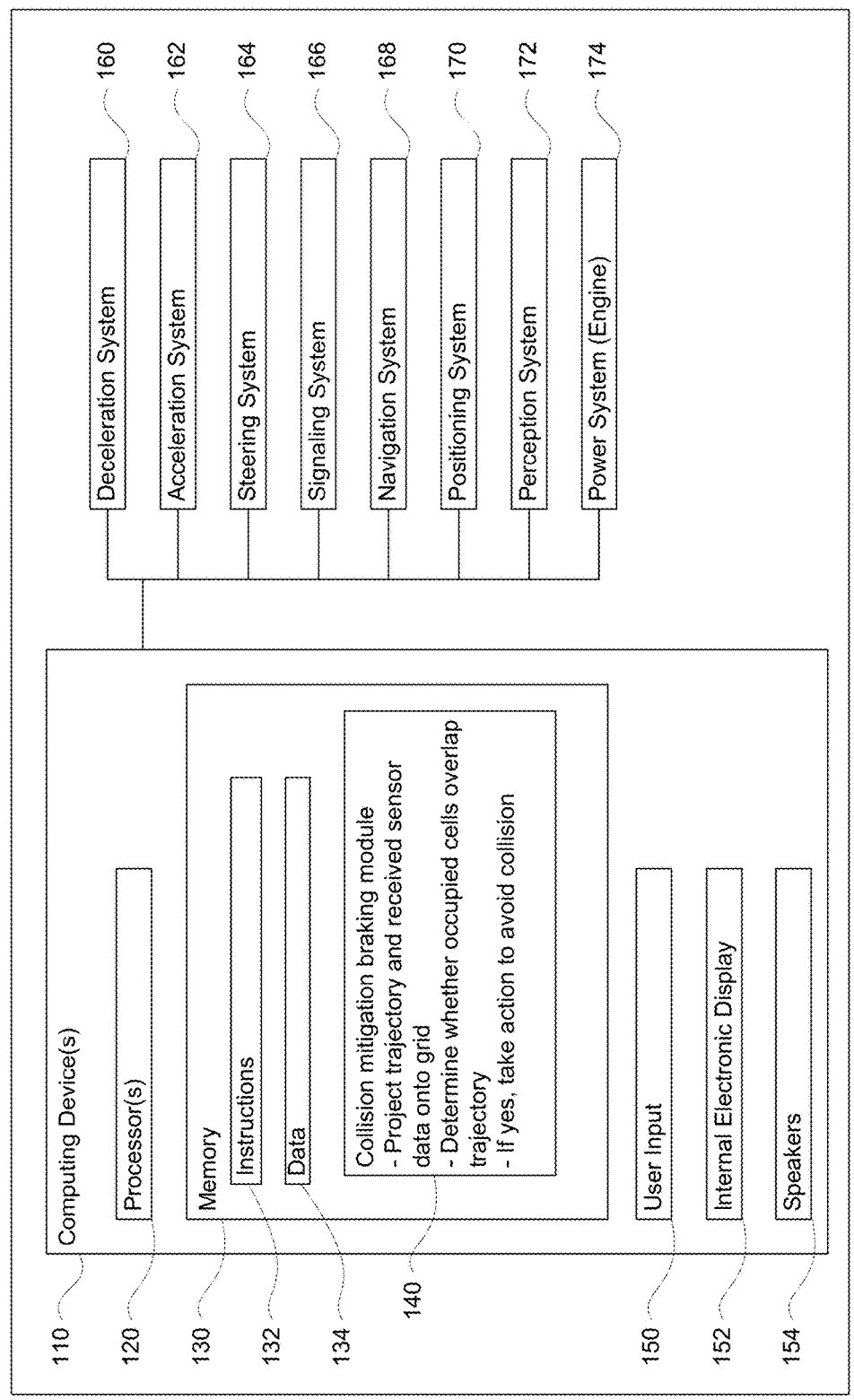
FIG. 1 is a functional diagram of an example vehicle in accordance with aspects of the disclosure.

The technology relates to collision mitigation braking (CMB), and verifying a trajectory using an occupancy map of static objects (in the following called static occupancy grid). A vehicle receives both processed sensor data from its perception system, as well as a set of raw sensor data. A trajectory for the vehicle is determined using a plurality of objects identified using the processed sensor data. A grid, such as a map of fixed sized cells, is projected over the trajectory. The grid may be, for example, a static occupancy grid. Raw data points, detected through the raw sensor data, are then projected onto the grid. Any cells through which the trajectory passes are identified. If any of those identified trajectory cells include the projected raw data points, or at least some minimum number of the raw data points, those cells may be considered to be occupied. This can be used to verify the trajectory. For instance, a trajectory would be verified if all of the trajectory cells are unoccupied. If a trajectory cannot be verified, the vehicle may be stopped to avoid passing through an occupied trajectory cell. It may be beneficial to trigger such stopping only when necessary.

The technology may be implemented in a Collision Mitigation Braking (CMB) module of an autonomous vehicle. The CMB module includes the static occupancy grid and a collision checking feature, such that the CMB module checks for collision using the static occupancy grid.

The static occupancy grid is a grid positioned around the autonomous vehicle using a fixed cell size. Each cell contains a probability that its area is occupied by an obstacle, the probability determined based on the raw sensor data. In some examples, an 8 bit unsigned integer represents the occupancy, where a value of 0 indicates that the cell is free, 128 indicates that occupancy is unknown, and 255 indicates that the cell is fully occupied. Initially all cells are unknown. The grid center is maintained in a position slightly ahead of the vehicle's current pose, wherein the pose may include a position and orientation of the vehicle. As such, there is more range forward than behind of the car. The grid moves along with the vehicle. New cells entering the grid as the vehicle moves along may be initialized as having an unknown occupancy.

Inputs to the static occupancy grid may include relative motion estimates and raw sensor data from range sensors. The motion estimates can come from inertial measurement units (IMUs), gyroscopes, odometers, encoders on a propulsion unit, or other sensors that measure the relative motion of the vehicle over time. Range sensors include Lidar, radar, cameras, or any other sensor that provides a distance measurement to other objects. Such inputs update the static occupancy grid with perceived obstacles.

Each obstacle updates a corresponding cell as occupied by increasing its count. The obstacles may not contain any information of whether they are from a moving or static object. Accordingly, cell updating could be done using a modified Bayes method, where the occupancy value is increased by a constant. The constant may be small, such that several hits on the same cell are required before a significantly high occupancy value is reached. If the obstacles refer to a static object then eventually the cell will become fully occupied. If the obstacles refer to a moving object then the cell will be updated only a few times until the object has passed the cell.

A field of view (FOV) is computed from the input range data, and differentiates what is ground (road) and what is an obstacle. For example, each range measurement may be a ray, and a measured distance on that ray identifies a point in 3-dimensional space. If the point lies on a ground, for example having an elevation of 0, it may be used to define the FOV. If the point is above ground, however, it may be considered an obstacle and used to increase a cell count within the static occupancy grid. For example, for each sensor ray in the FOV, all cells along the ray are updated by decreasing the cell's occupancy count, thereby indicating that the cells along the ray are free. A constant may be used, the constant being high such that any occupied cells are cleared quickly when the sensor FOV indicates they are free. This helps, for example, when driving behind a lead vehicle, to quickly clear the occupied cells induced by the lead vehicle's obstacles.

Cells having an occupancy value above a predetermined threshold may be considered to refer to a static object presenting an obstacle for the vehicle. In some examples, the predetermined threshold may be a value of approximately ¾ a full occupancy (e.g., 191 for a full occupancy value of 255). However, this threshold may be varied.

The collision checking feature of the CMB module simulates the vehicle moving on its published trajectory and coming to a stop. The trajectory has a width which is at least as large as a width of the vehicle. An algorithm for the collision checking feature allows the vehicle to follow its trajectory for the duration of one update cycle of the static occupancy grid which may be approximately 100 ms, and then applies maximum jerk (approximately $-10$ m/s$^3$) and deceleration (approximately 7 m/s$^2$) for coming to a stop. Using one update cycle of regular motion before slowing down allows for braking at the latest possible time while still avoiding a collision. If the vehicle does not detect a collision within the one updated cycle, it can continue following its trajectory. However, the first time a collision is detected, the vehicle would not be able to avoid collision if it followed the trajectory for one additional iteration, and therefore applies braking to avoid the collision. Poses may be sampled along the stopping trajectory at a predetermined time or distance, such as every 50 cm. At any pose along the trajectory until a stopping point, an outline corresponding to the vehicle must not overlap with any occupied cell in the grid. The occupied cells may correspond to static obstacles found in the grid. In some examples, the sampled poses should avoid overlap including a 10 cm buffer on all sides and 20 cm to the front and back when stopped. If an overlap is found, the CMB module triggers an event, such as publishing an alert message or sending a signal to a speed control module. This signal is intended to make the vehicle stop as soon as possible in order to avoid collision or at least reduce its severity.

Verifying the trajectory of autonomous vehicles using a collision mitigation system and the method described above provides for increased safety in the operation of autonomous vehicles. This technology can also be used in vehicles controlled by a human (as a driver assistance system). If processed sensor data from the vehicle's perception system does not detect an obstacle, a backup system will nevertheless provide for collision avoidance. Accordingly, a number of collisions will ultimately be reduced, thereby increasing safety of passengers of the autonomous vehicle as well as other travelers sharing a roadway with the autonomous vehicle.

Example System

As shown in FIG. 1, a vehicle 100 in accordance with one aspect of the disclosure includes various components. While certain aspects of the disclosure are particularly useful in connection with specific types of vehicles, the vehicle may be any type of vehicle including, but not limited to, cars, trucks, motorcycles, busses, recreational vehicles, etc. The vehicle may have one or more computing devices, such as computing devices 110 containing one or more processors 120, memory 130 and other components typically present in general purpose computing devices.

The memory 130 stores information accessible by the one or more processors 120, including instructions 132 and data 134 that may be executed or otherwise used by the processor 120. The memory 130 may be of any type capable of storing information accessible by the processor, including a computing device-readable medium, or other medium that stores data that may be read with the aid of an electronic device, such as a hard-drive, memory card, ROM, RAM, DVD or other optical disks, as well as other write-capable and read-only memories. Systems and methods may include different combinations of the foregoing, whereby different portions of the instructions and data are stored on different types of media.

The instructions 132 may be any set of instructions to be executed directly (such as machine code) or indirectly (such as scripts) by the processor. For example, the instructions may be stored as computing devices code on the computing device-readable medium. In that regard, the terms "instructions" and "programs" may be used interchangeably herein. The instructions may be stored in object code format for direct processing by the processor, or in any other computing devices language including scripts or collections of independent source code modules that are interpreted on demand or compiled in advance. Functions, methods and routines of the instructions are explained in more detail below.

The data 134 may be retrieved, stored or modified by processor 120 in accordance with the instructions 132. The one or more processor 120 may be any conventional processors, such as commercially available CPUs. Alternatively, the one or more processors may be a dedicated device such as an ASIC or other hardware-based processor. Although FIG. 1 functionally illustrates the processor, memory, and other elements of computing devices 110 as being within the same block, it will be understood by those of ordinary skill in the art that the processor, computing device, or memory may actually include multiple processors, computing devices, or memories that may or may not be stored within the same physical housing. As an example, internal electronic display 152 may be controlled by a dedicated computing devices having its own processor or central processing unit (CPU), memory, etc. which may interface with the computing devices 110 via a high-bandwidth or other network connection. In some examples, the computing devices may be a user interface computing devices which can communicate with a user's client device. Similarly, the memory may be a hard drive or other storage media located in a housing different from that of computing devices 110. Accordingly, references to a processor or computing devices will be understood to include references to a collection of processors or computing devices or memories that may or may not operate in parallel.

Computing device 110 may further include a collision mitigation braking (CMB) module 140. The CMB module 140 may include a static occupancy grid and a collision checking feature, such that the CMB module checks for collision using the static occupancy grid. The grid may be updated with sensor data from the perception system 172, as described in further detail below in connection with FIGS. 5A-B. The collision checking feature of the CMB module 140 simulates the vehicle 100 moving on its published trajectory and coming to a stop. The trajectory may have a width which is at least as large as a width of the vehicle. In other examples, the width may be wider or narrower. An algorithm for the collision checking feature allows the vehicle 100 to follow its trajectory for a duration of one static occupancy grid iteration, which may be approximately 100 ms, and then applies maximum jerk (approximately −10 m/s^3) and deceleration (approximately 7 m/s^2) for coming to a stop. Using one update cycle of regular motion before slowing down allows for braking at the latest possible time while still avoiding a collision. If the vehicle does not detect a collision within the one updated cycle, it can continue following its trajectory. However, the first time a collision is detected, the vehicle would not be able to avoid collision if it followed the trajectory for one additional iteration, and therefore applies braking to avoid the collision.

Poses may be sampled along the stopping trajectory at a predetermined time or distance, such as every 50 cm. At any pose along the trajectory until the stopping point, an outline corresponding to the vehicle 100 must not overlap with any occupied cell in the grid, the occupied cells corresponding to static obstacles. In some examples, the sampled poses should avoid overlap including a 10 cm buffer on all sides and 20 cm to the front and back when stopped. If an overlap is found, the CMB module triggers an event, such as publishing an alert message or sending a signal to a speed control module to stop as soon as possible in order to avoid collision. In this example, a width of the trajectory may be varied to be any width narrower or wider than the vehicle. Because the outline corresponding to the vehicle at various poses along the trajectory is compared to occupied cells, as opposed to comparing the trajectory itself to the occupied cells. While the CMB module 140 is depicted within the memory 130 of the computing device 110 in FIG. 1, it should be understood that the CMB module 140 may be a implemented as a separate unit in communication with other vehicle systems, such as deceleration system 160.

Computing devices 110 may include all of the components normally used in connection with a computing device, such as the processor and memory described above as well as a user input 150 (e.g., a mouse, keyboard, touch screen and/or microphone) and various electronic displays (e.g., a monitor having a screen or any other electrical device that is operable to display information). In this example, the vehicle includes an internal electronic display 152 as well as one or more speakers 154 to provide information or audio visual experiences. In this regard, internal electronic display 152 may be located within a cabin of vehicle 100 and may be used by computing devices 110 to provide information to passengers within the vehicle 100. In addition to internal speakers, the one or more speakers 154 may include external speakers that are arranged at various locations on the vehicle in order to provide audible notifications to objects external to the vehicle 100.

In one example, computing devices 110 may be an autonomous driving computing system incorporated into vehicle 100. The autonomous driving computing system may be capable of communicating with various components of the vehicle. For example, returning to FIG. 1, computing devices 110 may be in communication with various systems of vehicle 100, such as deceleration system 160 (for controlling braking of the vehicle), acceleration system 162 (for controlling acceleration of the vehicle), steering system 164 (for controlling the orientation of the wheels and direction of the vehicle), signaling system 166 (for controlling turn signals), navigation system 168 (for navigating the vehicle to a location or around objects), positioning system 170 (for determining the position of the vehicle), perception system 172 (for detecting objects in an external environment of the vehicle), and power system 174 (for example, a battery and/or gas or diesel powered engine) in order to control the movement, speed, etc. of vehicle 100 in accordance with the instructions 132 of memory 130 in an autonomous driving mode which does not require or need continuous or periodic input from a passenger of the vehicle. Again, although these systems are shown as external to computing devices 110, these systems may be incorporated into computing devices 110, again as an autonomous driving computing system for controlling vehicle 100.

The computing devices 110 may control the direction and speed of the vehicle by controlling various components. By way of example, computing devices 110 may navigate the vehicle to a destination location completely autonomously using data from the map information and navigation system 168. Computing devices 110 may use the positioning system 170 to determine the vehicle's location and perception system 172 to detect and respond to objects when needed to reach the location safely. In order to do so, computing devices 110 may cause the vehicle to accelerate (e.g., by increasing fuel or other energy provided to the engine by acceleration system 162), decelerate (e.g., by decreasing the fuel supplied to the engine, changing gears, and/or by applying brakes by deceleration system 160), change direction (e.g., by turning the front or rear wheels of vehicle 100 by steering system 164), and signal such changes (e.g., by lighting turn signals of signaling system 166). Thus, the acceleration system 162 and deceleration system 160 may be a part of a drivetrain that includes various components between an engine of the vehicle and the wheels of the vehicle. Again, by controlling these systems, computing devices 110 may also control the drivetrain of the vehicle in order to maneuver the vehicle autonomously.

As an example, computing devices 110 may interact with deceleration system 160 and acceleration system 162 in order to control the speed of the vehicle. Similarly, steering system 164 may be used by computing devices 110 in order to control the direction of vehicle 100. For example, if vehicle 100 configured for use on a road, such as a car or truck, the steering system may include components to control the angle of wheels to turn the vehicle. Signaling system 166 may be used by computing devices 110 in order to signal the vehicle's intent to other drivers or vehicles, for example, by lighting turn signals or brake lights when needed.

Figure 2:
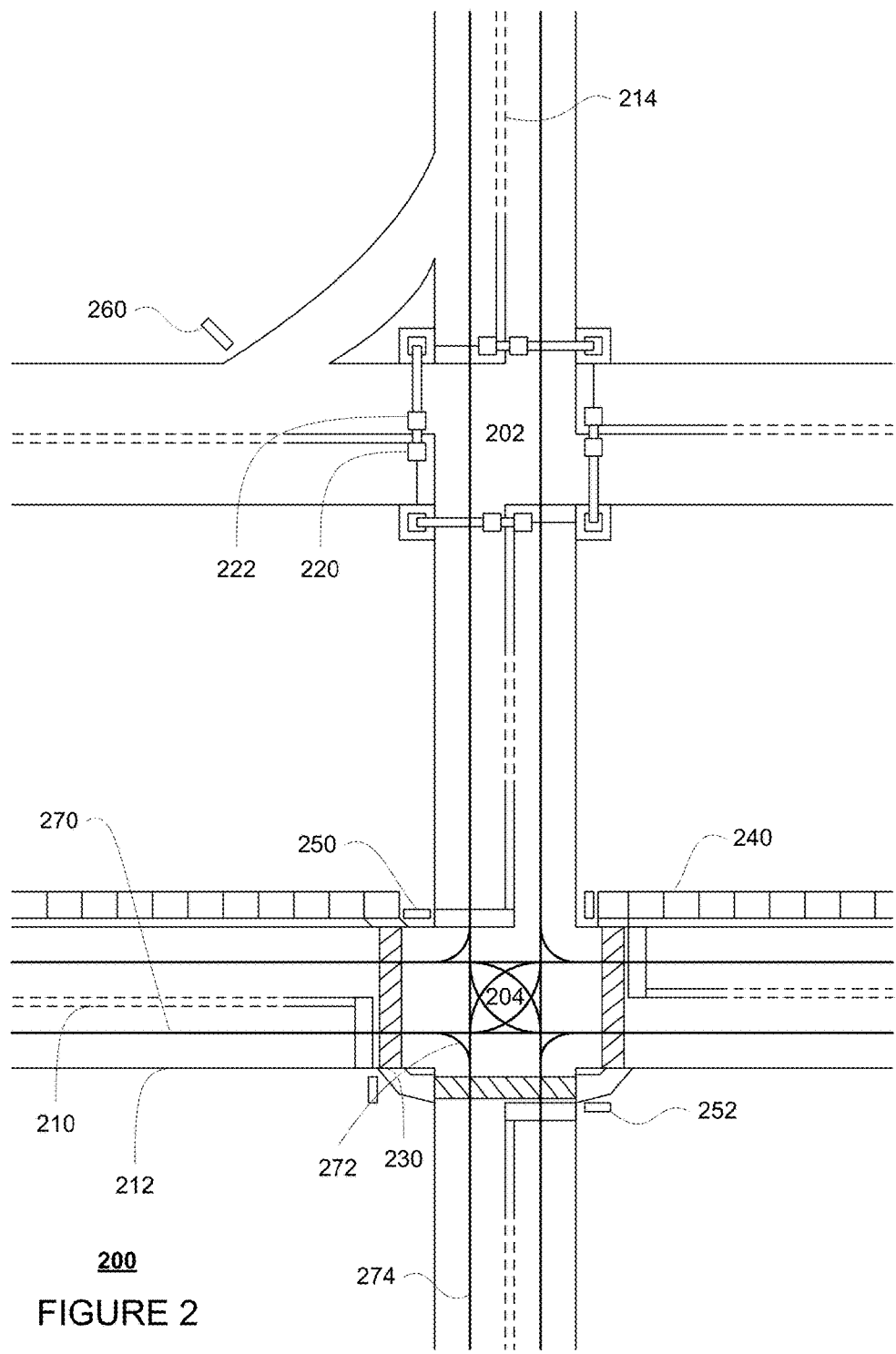
FIG. 2 is an example representation of detailed map information in accordance with aspects of the disclosure.
Figure 3A:
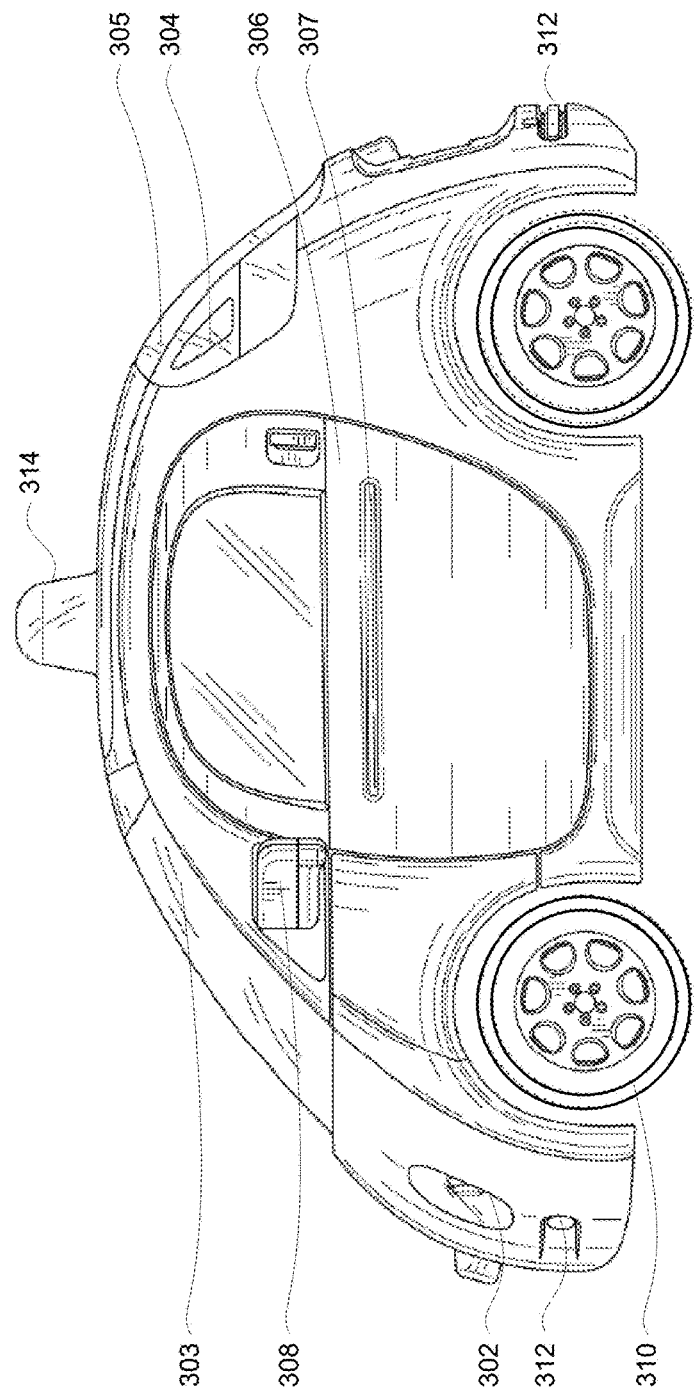
FIGS. 3A-3D are example external views of a vehicle in accordance with aspects of the disclosure.
Figures 3B, 3C:
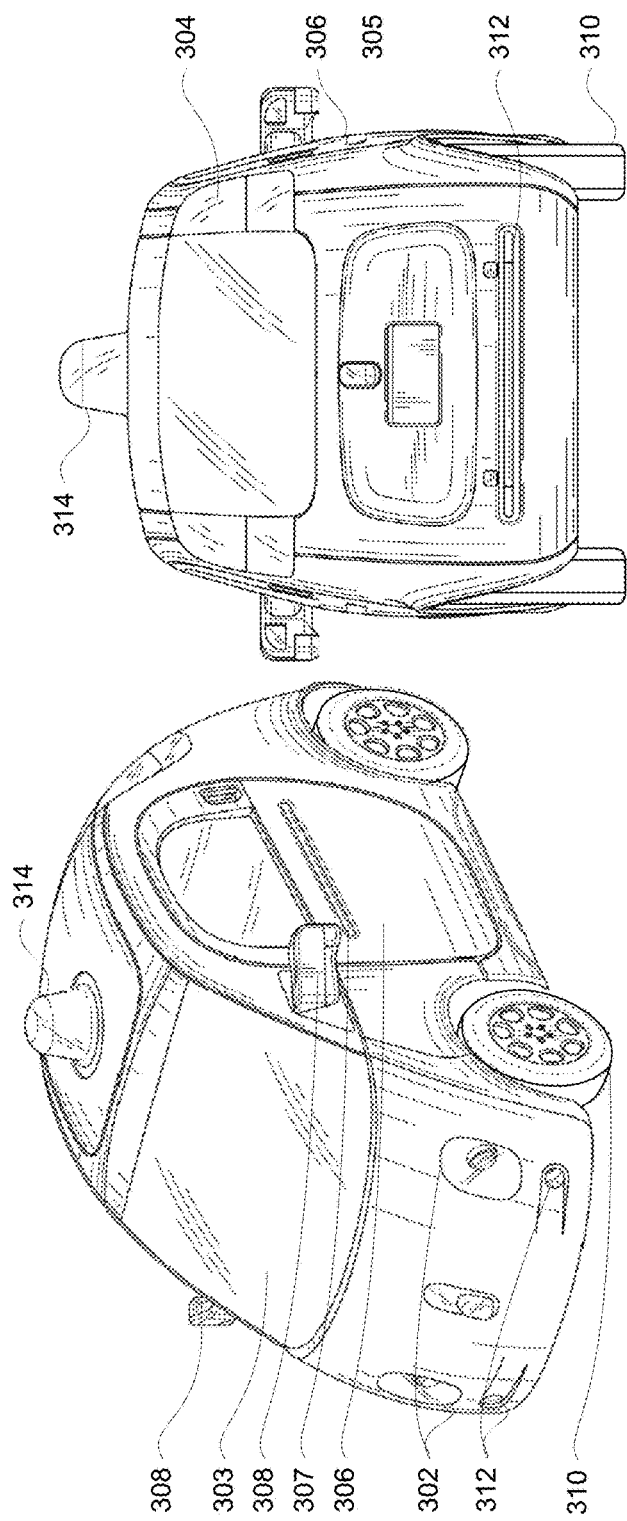
Figure 3D:
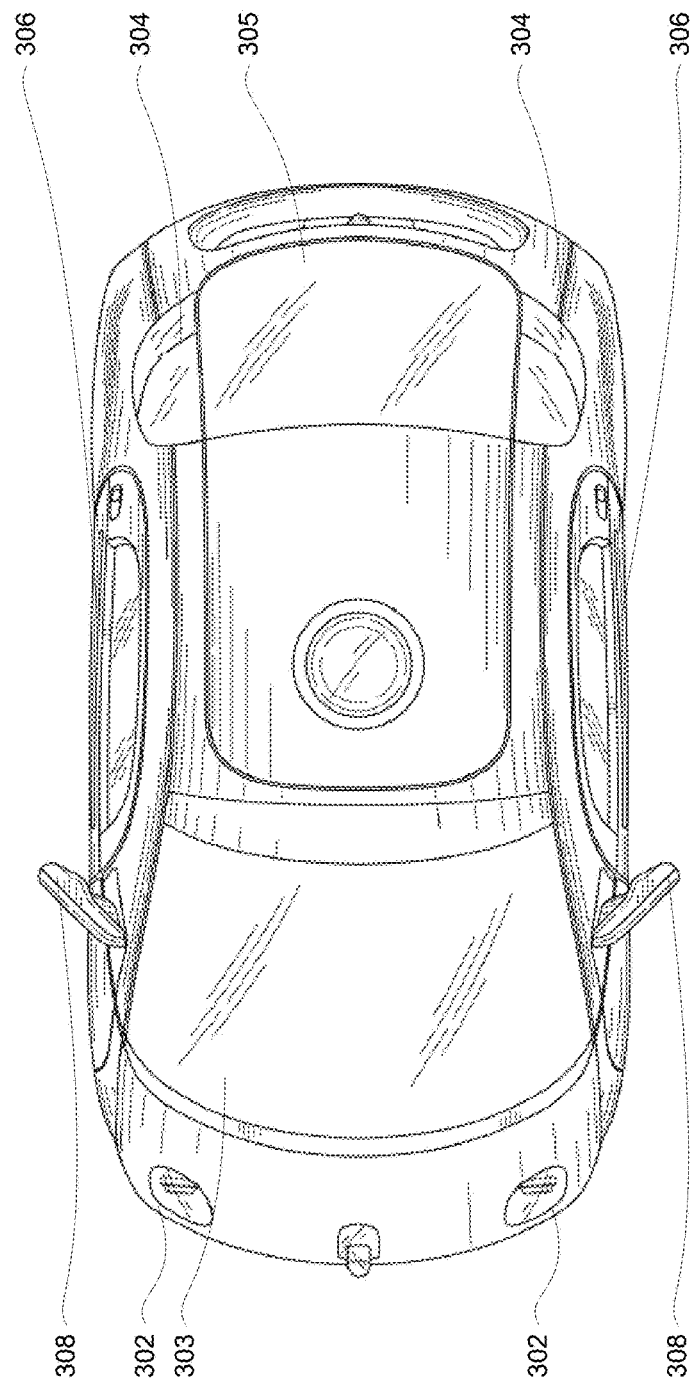

Navigation system 168 may be used by computing devices 110 in order to determine and follow a route to a location. In this regard, the navigation system 168 and/or data 134 may store detailed map information, e.g., highly detailed maps identifying the shape and elevation of roadways, lane lines, intersections, crosswalks, speed limits, traffic signals, buildings, signs, real time traffic information, vegetation, or other such objects and information. In other words, this detailed map information may define the geometry of vehicle's expected environment including roadways as well as speed restrictions (legal speed limits) for those roadways FIG. 2 is an example of map information 200 for a section of roadway including intersections 202 and 204. In this example, the map information 200 includes information identifying the shape, location, and other characteristics of lane lines 210, 212, 214, traffic signal lights 220, 222, crosswalk 230, sidewalks 240, stop signs 250, 252, and yield sign 260. Areas where the vehicle can drive may be associated with one or more rails 270, 272, and 274 which indicate the location and direction in which a vehicle should generally travel at various locations in the map information. For example, a vehicle may follow rail 270 when driving in the lane between lane lines 210 and 212, and may transition to rail 272 in order to make a right turn at intersection 204. Thereafter the vehicle may follow rail 274. Of course, given the number and nature of the rails only a few are depicted in map information 200 for simplicity and ease of understanding.

Although the detailed map information is depicted herein as an image-based map, the map information need not be entirely image based (for example, raster). For example, the detailed map information may include one or more roadgraphs or graph networks of information such as roads, lanes, intersections, and the connections between these features. Each feature may be stored as graph data and may be associated with information such as a geographic location and whether or not it is linked to other related features, for example, a stop sign may be linked to a road and an intersection, etc. In some examples, the associated data may include grid-based indices of a roadgraph to allow for efficient lookup of certain roadgraph features.

The perception system 172 also includes one or more components for detecting objects external to the vehicle such as other vehicles, obstacles in the roadway, traffic signals, signs, trees, etc. For example, the perception system 172 may include one or more LIDAR sensors, sonar devices, radar units, cameras and/or any other detection devices that record sensor data which may be processed by computing devices 110. The sensors of the perception system may detect objects and their characteristics such as location, orientation, size, shape, type (for instance, vehicle, pedestrian, bicyclist, etc.), heading, and speed of movement, etc. The raw data from the sensors and/or the aforementioned characteristics can be quantified or arranged into a descriptive function, vector, and or bounding box and sent as sensor data for further processing to the computing devices 110 periodically and continuously as it is generated by the perception system 172. As discussed in further detail below, computing devices 110 may use the positioning system 170 to determine the vehicle's location and perception system 172 to detect and respond to objects when needed to reach the location safely.

FIGS. 3A-3D are examples of external views of vehicle 100. As can be seen, vehicle 100 includes many features of a typical vehicle such as headlights 302, windshield 303, taillights/turn signal lights 304, rear windshield 305, doors 306, side view mirrors 308, tires and wheels 310, and turn signal/parking lights 312. Headlights 302, taillights/turn signal lights 304, and turn signal/parking lights 312 may be associated the signaling system 166. Light bar 307 may also be associated with the signaling system 166. Housing 314 may house one or more sensors, such as LIDAR sensors, sonar devices, radar units, cameras, etc. of the perception system 172, though such sensors may also be incorporated into other areas of the vehicle as well.

Example Methods

In addition to the operations described above and illustrated in the figures, various operations will now be described. It should be understood that the following operations do not have to be performed in the precise order described below. Rather, various steps can be handled in a different order or simultaneously, and steps may also be added or omitted.

Computing devices 110 may maneuver vehicle 100 to a destination location, for instance, to transport cargo and/or one or more passengers. In this regard, computing devices 110 may initiate the necessary systems to control the vehicle autonomously along a route to the destination location. For instance, the navigation system 168 may use the map information of data 134 to determine a path or route to the destination location that follows a set of connected rails of map information 200. The computing devices 110 may then maneuver the vehicle autonomously (or in an autonomous driving mode) as described above along the route towards the destination.

Figure 4:
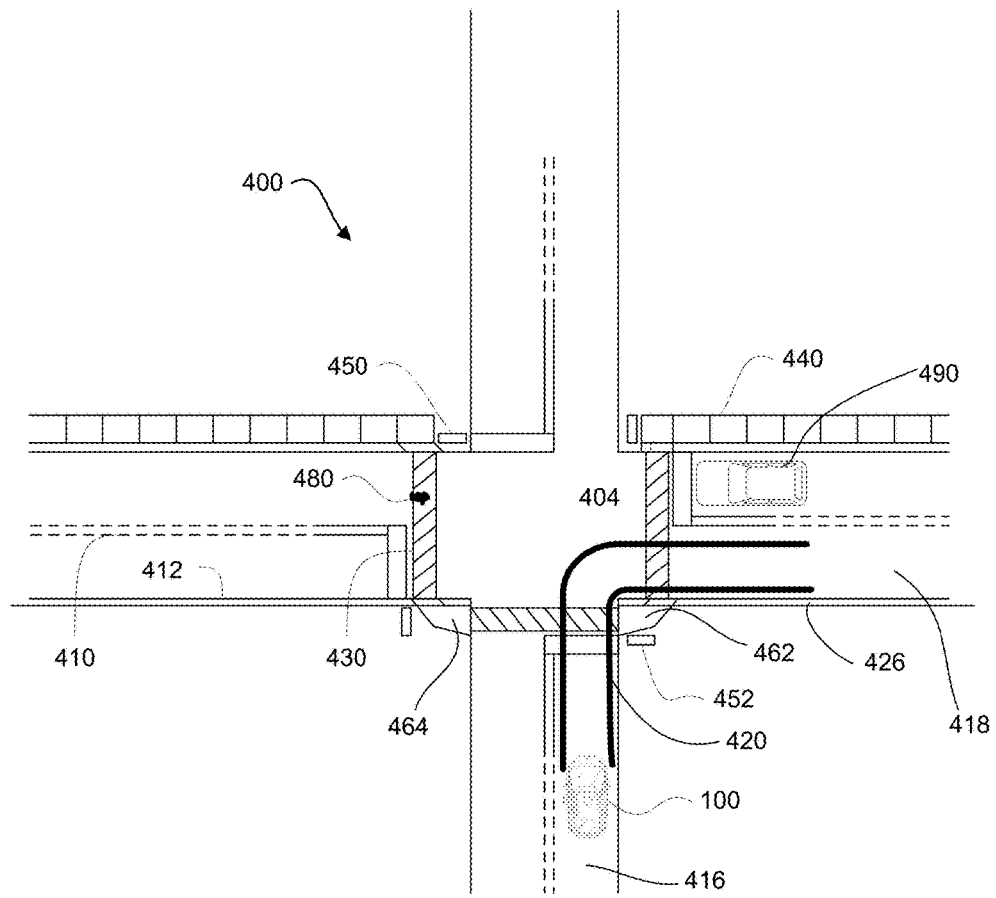
FIG. 4 is a view of a section of roadway in a first example scenario accordance with aspects of the disclosure.

For instance, FIG. 4 depicts vehicle 100 being maneuvered on a section of roadway 400 corresponding to the map information 200. In this example, intersection 404 corresponds to intersection 204 of the map information 200. In this example, lane lines 410, 412 correspond to the shape, location, and other characteristics of lane lines 210, 212, respectively. Similarly, crosswalk 430 corresponds to the shape, location, and other characteristics of crosswalk 230, respectively; sidewalks 440 correspond to sidewalks 240; and stop signs 450, 452 correspond to stop signs 250, 252, respectively. In addition, pedestrian 480 and vehicle 490 are arranged at different locations around roadway 400. FIG. 4 further includes a curb 426, and walkways 462, 464.

As the vehicle 100 moves through its environment, the vehicle's perception system 172 may provide the computing devices with sensor data including information about the vehicle's environment. As noted above, this sensor data may include the location, heading, speed, type and other characteristics such as the characteristics of features of the map information as well as other "road users" including objects such as vehicles, pedestrians and bicyclists. Accordingly, the vehicle 100 may receive a trajectory 420 indicating a projected path of travel for the vehicle 100.

In the example shown in FIG. 4, the trajectory 420 of the vehicle 100 extends a first distance in a northbound lane 416 to intersection 404, and then turns right onto an eastbound lane 418 for a second distance. The trajectory 420 may be computed by, for example, computing devices 110 or by other computing devices in communication with the computing devices 110. Such computations may be based on sensor data received through the vehicle's perception system 172, navigational information, route-planning information, heading and speed information, or any combination of the foregoing or other information. The trajectory 420 may project a predetermined distance from the vehicle, such as 5 feet, 50 feet, or any other relative distance. The trajectory may follow a curvature model based on a direction in which front wheels of the vehicle 100 are turned, or may include sharper turning angles, such as shown in FIG. 4, based on planned driving routes or other information. In some examples, the trajectory 420 may not be visible to occupants of the vehicle 100 or onlookers near the vehicle 100, but instead may be a representation used by the computing device 110.

Figure 5A:
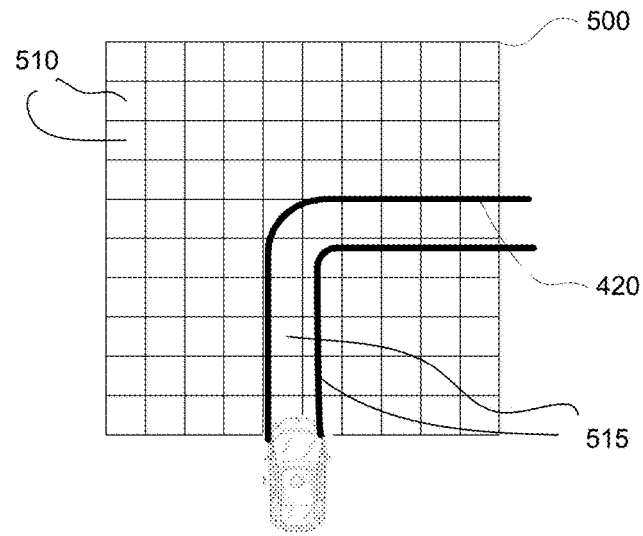
FIG. 5A is an example grid having a vehicle trajectory projected thereon in accordance with aspects of the disclosure.

As shown in FIG. 5A, the trajectory 420 is projected onto a grid 500, such as a static occupancy grid. The grid 500 may be a map having a plurality of cells 510. The cells 510 may be a fixed size, though the size may be predetermined to be larger or smaller based on tradeoffs of accuracy and processing speed. While the grid 500 is depicted a two-dimensional, it should be understood that the grid may have three or more dimensions. Moreover, while the grid 500 is illustrated from a top view, the grid as perceived by the vehicle 100 may have a different view. Even further, while the cells of the grid are illustrated as squares, it should be understood that the cells may each have a different fixed shape or orientation. For example, the cells may be triangles, diamonds, rectangles, etc.

Any cells through which the trajectory passes are identified. For example, as shown, the trajectory 420 passes through a number of identified cells 515. In this example, some of the identified cells 515 are only partially passed through by the trajectory 420. Because there is an overlap, such cells are included in the identified set. In other examples, the cells may be smaller, and the number of cells may be greater, thereby increasing a granularity of the grid and reducing a significance of cells being only partially intersected by the trajectory 420.

Figure 5B:
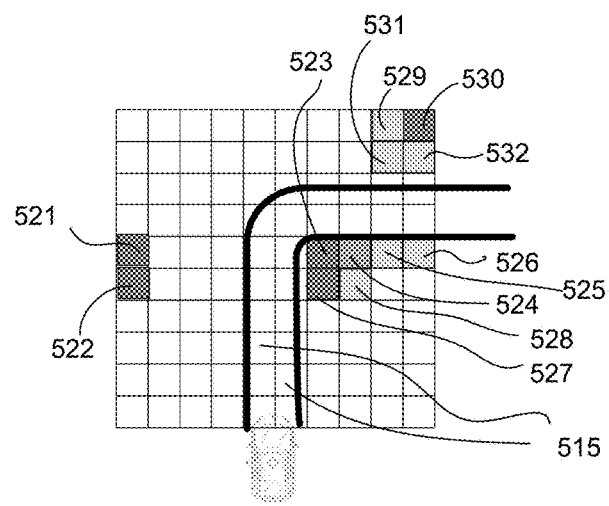
FIG. 5B is an example grid having a vehicle trajectory and raw sensor data projected thereon in accordance with aspects of the disclosure.

As shown in FIG. 5B, data from the perception system is also projected onto the grid 510. For example, each cell may be initialized as having an unknown occupancy. As such, each cell may start by being blank, or having a value of zero. As obstacles are detected by the perception system, each obstacle updates a corresponding cell to indicate the cell is occupied, for example, by increasing its count or assigned value. For example, an 8 bit unsigned integer may represent the occupancy, where a value of 0 indicates that the cell is free, 128 indicates that occupancy is unknown, and 255 indicates that the cell is fully occupied.

The detected obstacles may be either moving or static objects. Accordingly, cell updating could be done using a modified Bayes method, where the occupancy value is increased by a constant. The constant may be small, such that several hits on the same cell are required before a significantly high occupancy value is reached. If the obstacles refer to a static object then eventually the cell will become fully occupied. If the obstacles refer to a moving object then the cell will be updated only a few times until the object has passed the cell. The grid center is maintained in a position slightly ahead of the vehicle's current pose, such that there is more range forward than behind of the car. The grid moves along with the vehicle.

Inputs to the static occupancy grid may include relative motion estimates and raw sensor data from range sensors. The motion estimates can come from inertial measurement units (IMUs), gyroscopes, odometers, encoders on a propulsion unit, or other sensors that measure the relative motion of the vehicle over time. Range sensors include Lidar, radar, sonar, cameras, or any other sensor that provides a distance measurement to other objects. Such inputs update the static occupancy grid with perceived obstacles.

Each obstacle updates a corresponding cell as occupied by increasing its count. The obstacles may not contain any information of whether they are from a moving or static object. Accordingly, cell updating could be done using a modified Bayes method, where the occupancy value is increased by a constant. The constant may be small, such that several hits on the same cell are required before a significantly high occupancy value is reached. If the obstacles refer to a static object then eventually the cell will become fully occupied. If the obstacles refer to a moving object then the cell will be updated only a few times until the object has passed the cell.

A field of view (FOV) is computed from the input range data, and differentiates what is ground (road) and what is an obstacle. For example, each range measurement may be a ray, and a measured distance on that ray identifies a point in 3-dimensional space. If the point lies on a ground, for example having an elevation of 0, it may be used to define the FOV. If the point is above ground, however, it may be considered an obstacle and used to increase a cell count within the static occupancy grid. For example, for each sensor ray in the FOV, all cells along the ray are updated by decreasing the cell's occupancy count, thereby indicating that the cells along the ray are free. A constant may be used, the constant being high such that any occupied cells are cleared quickly when the sensor FOV indicates they are free. This helps, for example, when driving behind a lead vehicle, to quickly clear the occupied cells induced by the lead vehicle's obstacles.

Cells having an occupancy value above a predetermined threshold may be considered to refer to a static object presenting an obstacle for the vehicle. In some examples, the predetermined threshold may be a value of approximately ¾ a full occupancy (e.g., 191 for a full occupancy value of 255). However, this threshold may be varied As seen in FIG. 5B, particular cells are updated based on detected obstacles. Each updated cell contains a probability that its area is occupied by an obstacle, the probability determined based on the raw sensor data from the perception system. The updated cells corresponding to areas occupied by obstacles include cells 521-532. Some cells, such as cells 523 and 527, may have a higher occupancy value than other cells, such as cells 524, 525, 526. In the example illustrated, the higher occupancy values are indicated by a darker shading. The higher occupancy values may be a result of more updates to the particular darker shade cells as compared to the obstacles in areas corresponding to the lighter shaded cells.

If any of those identified trajectory cells 515 include the projected raw data points, or at least some minimum number of the raw data points, those cells may be considered to be occupied. This can be used to verify the trajectory 420. For instance, a trajectory 420 would be verified if all of the trajectory cells are unoccupied. In the examples of FIG. 5B, none of the identified trajectory cells 515 are occupied by the sensor data projected onto the grid 500. Thus, in this example, the trajectory 420 may be verified, and therefore a vehicle may be permitted to continue traveling along the trajectory 420. If a trajectory cannot be verified, such as in further examples described in more detail below, the vehicle may be stopped to avoid passing through an occupied trajectory cell.

Figure 6:
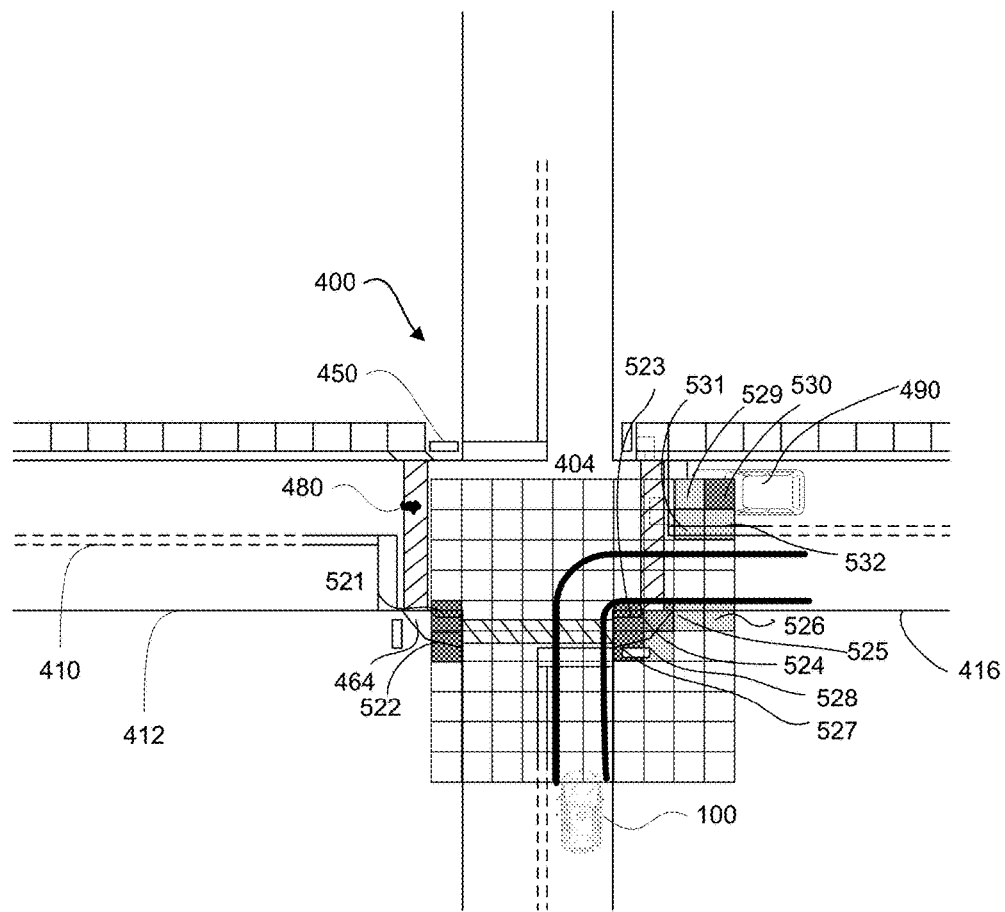
FIG. 6 is a view of a section of roadway in relation to the grid of FIG. 5B in accordance with aspects of the disclosure.

FIG. 6 illustrates an example of the grid 500 in relation to the roadway 400, which shows the obstacles corresponding to the updated cells 521-532 on the grid. Cell 527 corresponds to an area of the stop sign 452 of FIG. 4, while cells 523, 524, and 528 correspond to walkway 462. Cells 525 and 526 correspond to the curb 426. Cells 529-532 correspond to the additional vehicle 490. Cells 521 and 522 correspond to the walkway 464. The CMB module of the vehicle 100 checks for overlap of the trajectory 420 with the occupied cells 521-532. Because none of the cells 521-532 overlap with the trajectory 420, the vehicle 100 can safely continue along the roadway 400.

While crosswalks, lane lines, and other road markings may be detected by the perception system of the vehicle 100, such road markings may be distinguishable by the perception system. For example, road marking may have a different reflection for laser measurements, such as by returning more energy back to the sensor than a dark or black road surface would return. As discussed above, ground level points may be detected as having an elevation of 0, and thus are considered the FOV and not used to updated the grid 500. However, points detected above a threshold elevation may be considered obstacles, and thus used to update the grid 500.

While the grid in FIG. 6 is shown in a first position generally in front of the vehicle 100, the grid 500 may continually move as the vehicle 100 moves. For example, as the vehicle 100 travels forward along northbound lane 416, the grid 500 moves along with the vehicle 100. As the grid 500 moves, and the vehicle 100 continues to receive sensor data, the cells of the grid 500 are continually updated. For example, new cells are added and updated with sensor data. Old cells, which may be behind the vehicle 100 after the vehicle 100 has moved forward, may be removed. Moreover, the grid may be positioned relative to the vehicle 100 depending on a direction of travel of the vehicle 100. For example, if the vehicle 100 is backing up in reverse, the grid 500 may be positioned generally behind a rear portion of the vehicle 100.

Figure 7:
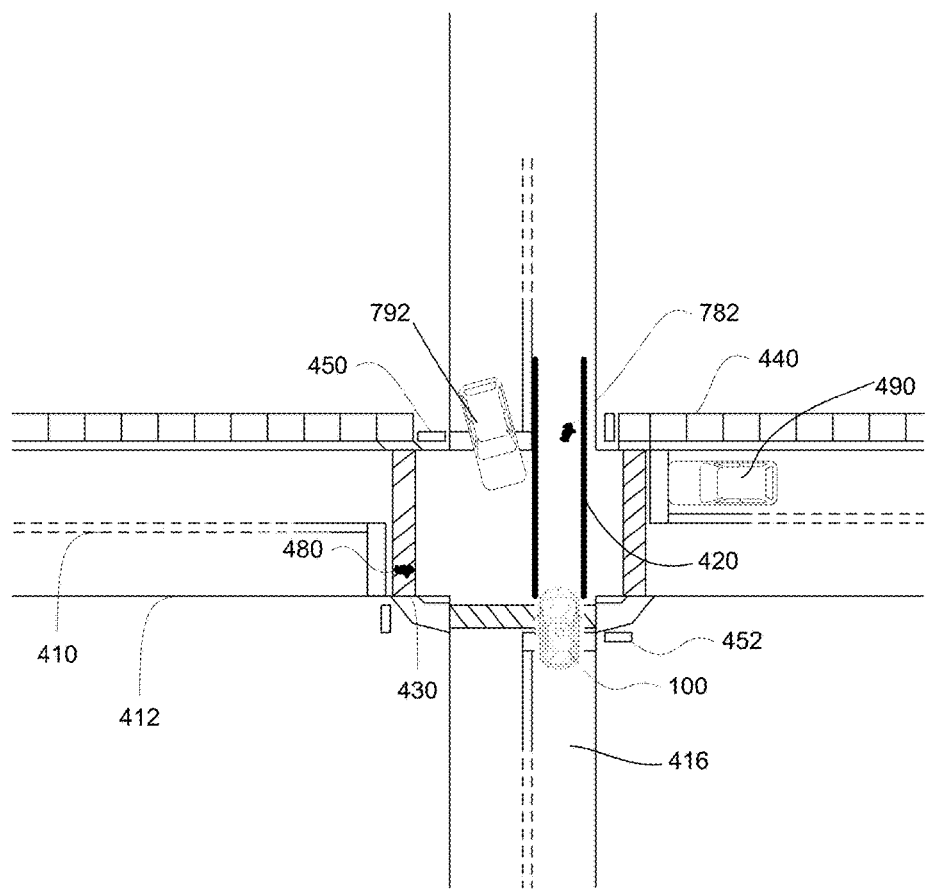
FIG. 7 is a view of a section of roadway in a second example scenario in accordance with aspects of the disclosure.

FIG. 7 illustrates another example scenario, where the vehicle 100 has moved forward along a northbound lane 416 of the roadway 400. In this example, however, the vehicle 100 is traveling along a different trajectory 720, which continues straight along the northbound lane 416. Also in this example, pedestrian 782 is present.

Figure 8A:
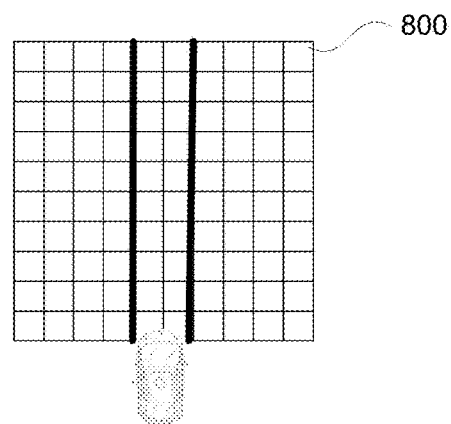
FIG. 8A is an example grid having another example vehicle trajectory projected thereon in accordance with aspects of the disclosure.
Figure 8B:
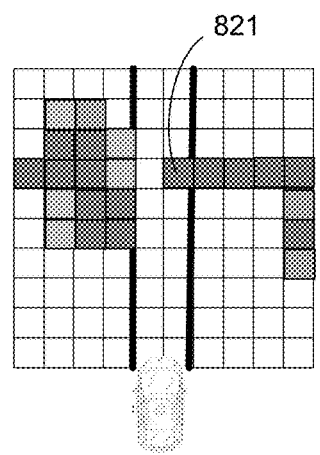
FIG. 8B is an example grid having the other example vehicle trajectory and raw sensor data projected thereon in accordance with aspects of the disclosure.

FIG. 8A illustrates a projection of the trajectory 720 onto grid 800. FIG. 8B illustrates a projection of sensor data received at the vehicle 100 onto the grid 800. As seen in FIG. 8B, a plurality of the cells are indicated as corresponding to areas where there are obstacles. Such obstacles include stop sign 450, vehicle 792, pedestrian 782, vehicle 490, and sidewalk 440 of FIG. 7. At least one cell, in particular cell 821, overlaps with the trajectory. Accordingly, in this example the collision mitigation module would trigger an action by the vehicle 100, such as decelerating, stopping and waiting, changing direction, sending an alert notification to an operator of the vehicle 100, etc.

Figure 9:
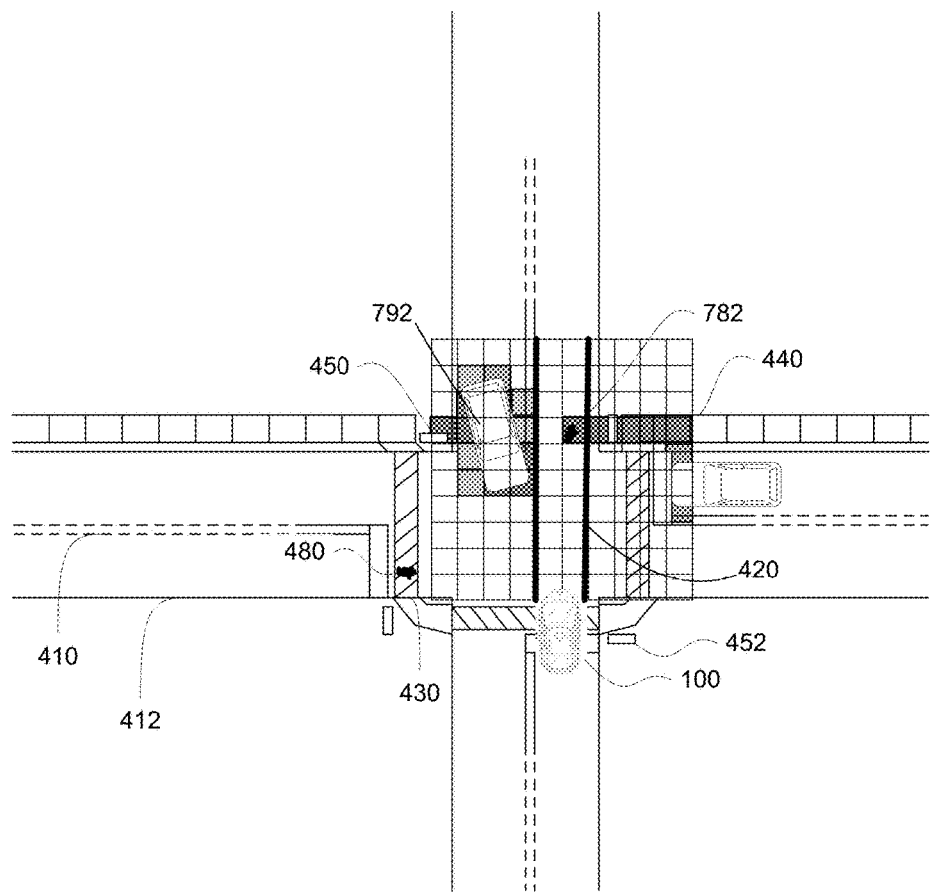
FIG. 9 is a view of a section of roadway in relation to the grid of FIG. 8B in accordance with aspects of the disclosure.

FIG. 9 illustrates the updated grid 800 in relation to the scenario of FIG. 7. As seen in FIG. 9, pedestrian 782 is in the path of the trajectory 720. The collision mitigation system of the vehicle 100, upon determining the pedestrian 782 to be an obstacle along the trajectory 720, causes the vehicle 100 to avoid the pedestrian 782, such as by braking.

The collision checking feature of the CMB module simulates the vehicle 100 moving on the trajectory 720 and coming to a stop. For example, the simulation allows the vehicle to follow its trajectory for a duration of one or more static occupancy grid iterations. Each grid update iteration may be, by way of example only, between approximately 1 ms-1 s. After the duration, stopping may be simulated, for example, by applying maximum jerk (approximately −10 m/s^3) and deceleration (approximately 7 m/s^2), wherein such simulated stopping causes the vehicle to follow a stopping trajectory which may be different than the original driving trajectory. For example, while a geometry of the stopping trajectory may be the same as the original driving trajectory, a speed profile associated with the stopping trajectory will be different than the original driving trajectory. Poses may be sampled along the stopping trajectory at a predetermined time or distance, such as every 50 cm, every 100 cm, every 100 ms, or any other time or distance or continuously along the stopping trajectory. At any pose along the trajectory until the stopping, an outline corresponding to the vehicle must not overlap with any occupied cell in the grid. The occupied cells may correspond to static obstacles found in the grid. In some examples, the sampled poses should avoid overlap including a buffer on all sides and in front and back when stopped. The buffer may be, for example, between several centimeters to several hundred centimeters, and may be different along some portions of the vehicle than for other portions. If an overlap is found, the CMB module triggers a collision mitigation event, such as publishing an alert message or sending a signal to a speed control module to make the vehicle stop as soon as possible.

Figure 10:
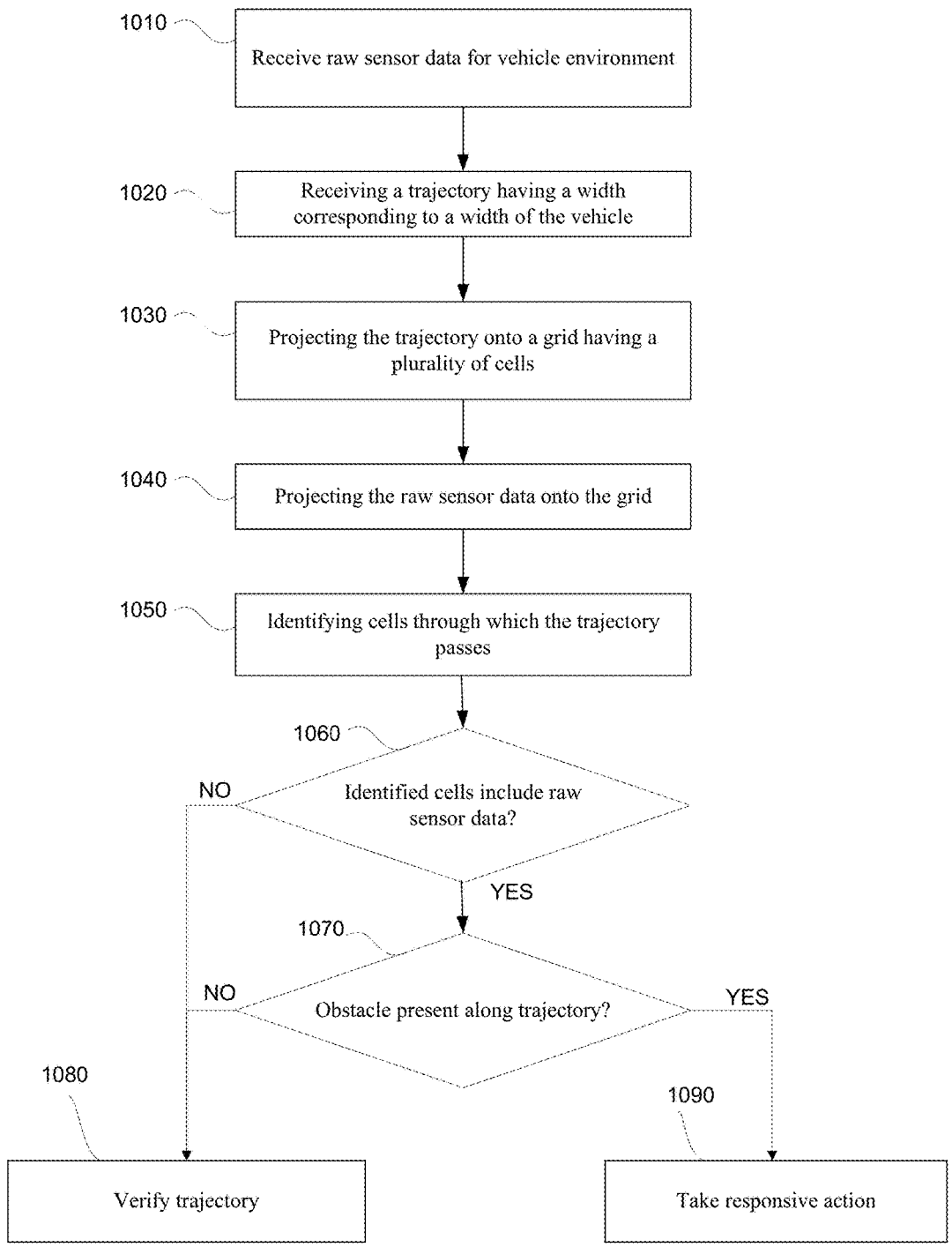
FIG. 10 is a flow diagram in accordance with aspects of the disclosure.

FIG. 10 illustrates a method 1000 for mitigating collisions using a grid, such as a static occupancy grid. The method may be performed by, for example, a computing system of an autonomous vehicle.

In block 1010, raw sensor data is received for the vehicle's environment. The raw sensor data may be received through one or more sensors of a perception system, such as a radar, lidar, sonar, camera, light sensor, motion sensor, etc. The raw sensor data includes a detection of obstacles in the vehicle's driving environment, such as trees, curbs, medians, street signs, traffic lights, pedestrians, cyclists, motorists, vehicles, and any other obstacles. In some examples, such obstacles may be distinguished from driving surfaces, such as roadways, or objects through which the vehicle can move, such as rain, fog, etc.

In block 1020, a trajectory is received, the trajectory having a width corresponding to a width of the vehicle. For example, the width of the trajectory may be at least as wide or wider than the vehicle. The trajectory may be received from a system local to or remote from the vehicle. For example, the trajectory may be received from a navigation system, driving system, sensor system etc. In other examples, the trajectory may be computed by a computing device within the vehicle based on information received from one or more systems. For example, the trajectory may be computed based on heading, speed, navigational information, wheel turn, etc. In some examples, a length of the trajectory may be determined by a range of the one or more sensors of the perception system.

In block 1030, the trajectory is projected onto a grid having a plurality of cells. The grid may be, for example, a static occupancy grid. The cells of the grid may all be a same fixed size. The size may be predetermined, for example, based on considerations of computing resources and accuracy. For example, larger grid cells may enable fast computations using less resources. However, smaller grid cells may be more accurate.

In block 1040, the raw sensor data is projected onto the grid along with the trajectory. For example, each detection of an obstacle present in an area corresponding to a particular grid cell may cause a value associated with the particular grid cell to be updated by a predetermined amount. Accordingly, as obstacles are continually detected in the area corresponding to the particular grid cell, the value associated with the particular grid cell will continue to rise. At some point, the value may reach a predetermined threshold, indicating with some degree of certainty that the obstacle is present at the area. Moving objects, however, may move from the corresponding area prior to the value for the particular grid cell reaching the threshold. In some examples, the grid is visually updated in accordance with the associated values, such as by coloring or shading the cells. In further examples, representations of the obstacles may be generated for the updated cells. For example, where the updated cells above the threshold indicate presence of a three dimensional object, a three dimensional rendering of the object may be added to the grid.

In block 1050, cells through which the trajectory passes are identified. In block 1060, it is determined whether the identified cells through which the trajectory passes include the sensor data. For example, it is determined whether any of the identified cells have been updated with a value, which may or may not be above the threshold. If none of the identified cells within the trajectory include the raw sensor data, then the trajectory may be verified in block 1080.

If one or more of the identified cells within the trajectory include the raw sensor data, the process may proceed to block 1070 where it is determined whether an obstacle is present in the trajectory. For example, some cells within the trajectory may have been updated based on a moving object, which is no longer within the trajectory. As such, the identified cells may be below the threshold indicating presence of an obstacle. In other examples, some cells within the trajectory may have been updated with sensor data, but it may be later determined that the sensor data relates to a condition through which the vehicle can be driven, such as water or vehicle exhaust expelled from a leading vehicle. If no obstacles are determined to be present along the trajectory, the method may proceed to block 1080. In some examples, it may further be verified that cells along the trajectory are sufficiently marked as free or clear. For example, free cells may have been updated with less than a predetermined threshold of data points. In this example, the FOV may update cells as free, and prevent the vehicle from driving into unknown cells having a value above the predetermined threshold for free cells and below the threshold for occupied cells.

If it is determined that an obstacle is present along the trajectory, the method may proceed to block 1090 where a responsive action is taken. The responsive action may be, for example, transmission of a signal, such as an alert to an operator of the vehicle to take manual control, or a signal to a driving system to maneuver the vehicle to avoid the obstacle. For example the signal may cause the vehicle to slow down, stop, and/or change directions or the like.

As the vehicle moves along a roadway or other driving terrain, the trajectory and grid may be continually updated. For example, as the vehicle travels a distance corresponding to one or more cells, the cells that have been passed may be removed and new cells at a most distant edge of the grid may be added. Moreover, a second trajectory may be projected onto the updated grid, the second trajectory updating and replacing the initial trajectory.

In addition to the vehicle's standard detection of objects and navigation around same, the collision mitigation system may be implemented as a backup mechanism for continually ensuring that a driving path is clear and avoiding collisions. In this regard, the safety of the vehicle is increased.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method of verifying a trajectory through a driving environment of a vehicle, the method comprising:
   receiving, from a perception system of the vehicle, raw sensor data for the vehicle's environment;
   receiving the trajectory;
   projecting the trajectory onto a grid having a plurality of cells;
   projecting the raw sensor data onto the grid;
   determining whether any cell containing the raw sensor data overlaps with the trajectory;
   determining, based on the raw sensor data within cells that overlap with the trajectory, whether an obstacle is present along the trajectory; and
   when no obstacles are determined to be present along the trajectory, verifying the trajectory.

2. The method of claim 1, wherein determining whether an obstacle is present along the trajectory comprises determining, for each given cell that overlaps with the trajectory, whether the given cell includes a threshold number of data points of the raw sensor data.

3. The method of claim 1, further comprising updating the grid.

4. The method of claim 3, wherein updating the grid comprises adding new cells as the vehicle moves a distance.

5. The method of claim 4, further comprising:
initializing the new cells as having an unknown occupancy;
increasing a count for each cell for each sensor data point that indicates an object above the ground; and
decreasing the count for each sensor data point that refers to the ground.

6. The method of claim 3, further comprising:
determining a second trajectory for the vehicle as the vehicle moves the distance;
determining, based on the updated grid, whether an obstacle is present along the second trajectory; and
validating the second trajectory based on the determining whether an obstacle is present along the second trajectory.

7. The method of claim 1, further comprising maneuvering the vehicle along the trajectory when the trajectory is verified.

8. The method of claim 1, further comprising taking a responsive action when the trajectory is not verified, the responsive action including at least one of generating an alert or slowing movement of the vehicle to avoid a collision.

9. The method of claim 1, further comprising modifying the trajectory when the trajectory is not verified.

10. The method of claim 1, wherein the grid is a 2-dimensional grid.

11. The method of claim 1, further comprising:
receiving, from the perception system of the vehicle, processed sensor data identifying objects in the driving environment; and
computing the trajectory using the processed sensor data.

12. A collision mitigation system for a vehicle, comprising:
a memory;
one or more processors in communication with the memory, the one or more processors configured to:
receive, from a perception system of the vehicle, raw sensor data for an environment of the vehicle;
receive a trajectory;
project the trajectory onto a grid having a plurality of cells;
project the raw sensor data onto the grid;
determine whether any cell containing the raw sensor data overlaps with the trajectory;
determine, based on the raw sensor data within cells that overlap with the trajectory, whether an obstacle is present along the trajectory; and
when no obstacles are determined to be present along the trajectory, verify the trajectory.

13. The system of claim 12, wherein in determining whether an obstacle is present along the trajectory, the one or more processors are further configured to determine, for each given cell that overlaps with the trajectory, whether the given cell includes a threshold number of data points of the raw sensor data.

14. The system of claim 12, wherein the one or more processors are further configured to update the grid.

15. The system of claim 14, wherein updating the grid comprises adding new cells as the vehicle moves a distance.

16. The system of claim 15, wherein the one or more processors are further configured to:
initialize the new cells as having an unknown occupancy;
increase a count for each cell for each sensor data point that indicates an object above the ground; and
decrease the count for each sensor data point that refers to the ground.

17. The system of claim 12, wherein the one or more processors are further configured to cause the vehicle to maneuver along the trajectory when the trajectory is verified.

18. The system of claim 12, wherein the one or more processors are further configured to cause the vehicle to take a responsive action when the trajectory is not verified, the responsive action including at least one of generating an alert or slowing movement of the vehicle to avoid a collision.

19. The system of claim 12, wherein the one or more processors are further configured to:
receive, from the perception system of the vehicle, processed sensor data identifying objects in the vehicle's environment; and
compute the trajectory using the processed sensor data.

20. An autonomous vehicle, comprising:
an acceleration system;
a steering system;
a braking system;
a perception system; and
a control system in communication with the acceleration system, the braking system, and the perception system;
wherein the control system comprises one or more processors configured to:
receive, from the perception system of the vehicle, raw sensor data for an environment of the vehicle;
receive a trajectory, the trajectory having a width corresponding to a distance that is at least as wide as the vehicle;
project the trajectory onto a grid having a plurality of cells;
project the raw sensor data onto the grid;
determine whether any cell including the raw sensor data overlaps with the trajectory;
determine, based on the raw sensor data within cells that overlap with the trajectory, whether an obstacle is present along the trajectory; and
when no obstacles are determined to be present along the trajectory, verify the trajectory.

21. The autonomous vehicle of claim 20, wherein the control system causes the acceleration system and the steering system to maneuver the vehicle along the trajectory when the trajectory is verified, and wherein the control system causes the braking system to slow movement of the vehicle to avoid a collision when the trajectory is not verified.

* * * * *